INVENTOR:
DEAN W. RUNDQUIST
BY: H. D. Birch
HIS ATTORNEY

INVENTOR:
DEAN W. RUNDQUIST
BY: *H.D. Burch*
HIS ATTORNEY

Aug. 21, 1962 D. W. RUNDQUIST 3,050,113
APPARATUS FOR THE COAGULATION AND RECOVERY OF POLYMERS
Filed Sept. 17, 1959 3 Sheets-Sheet 3

INVENTOR:
DEAN W. RUNDQUIST
BY: H. D. Burch
HIS ATTORNEY

United States Patent Office 3,050,113
Patented Aug. 21, 1962

3,050,113
APPARATUS FOR THE COAGULATION AND RECOVERY OF POLYMERS
Dean W. Rundquist, Long Beach, Calif., assignor to Shell Oil Company, a corporation of Delaware
Filed Sept. 17, 1959, Ser. No. 840,549
3 Claims. (Cl. 159—13)

This invention relates to an apparatus for the coagulation and recovery of polymers. More particularly, it relates to an apparatus for causing the separation of polymers as a solid from hydrocarbon solutions.

It is known that useful elastomers may be produced from conjugated dienes wherein the elastomers have a high content of the cis 1,4-addition product. The more useful of the cis 1,4-addition products are those prepared from isoprene and butadiene as they have properties that make them particularly suitable for the manufacture of automobile and truck tires and other applications where natural rubber is used. The prior art directed to the polymerization of conjugated dienes to produce cis 1,4-addition products is well known. It is sufficient to mention that cis 1,4-polyisoprene may be produced by polymerizing isoprene with any of a large variety of hydrocarbyl lithium catalyst. Such polymerizations are conducted at temperatures ranging from about 25° C. to about 100° C. at ambient pressures. The quantity of catalyst employed may be as low as .03 millimole per mole of isoprene and may be as high as 2 millimoles per mole of the isoprene. Alternatively, the elastomer solution may be prepared with catalysts of the type used to produce cis 1,4-polybutadiene.

The cis 1,4-polybutadiene is prepared with a catalyst that is the reaction product of a transition metal compound particularly halides, of a group IV to VIII metal and a strong reducing agent. The reducing agent may be, for example, a metal compound, particularly organo-metallics, of a group I–III metal. Of the numerous reducing agents that may be employed organo-aluminum compounds are favored and are most often described as being useful to produce the polybutadiene having a high content of the cis 1,4-addition product.

Many combinations are known for the formation of cis 1,4-polybutadiene but it may be stated that transition metal halides of group IV, particularly of titanium, are preferred for use with organo-aluminum compounds. As in the case of isoprene, the polymerization temperatures range from about 25° C. to about 100° C. at ambient pressure and the mole ratios are such that the metal halide is present in molar excess of the organo-metallic compound.

Other classes of highly used elastomers are represented by the copolymers of ethylene and propylene which are produced by polymerizing a mixture of the monomers with a catalyst comprising the reaction product of, for example, vanadium oxychloride and a reducing agent of the type previously described.

The elastomers are produced under conditions that exclude atmospheric impurities particularly oxygen and water. Additionally, impurities as sulfur, sulfur-containing compounds, oxygen-containing compounds, and the like are also to be excluded if a polymer is to be obtained that falls within the useful rubber range. The polymerizations are conducted in the presence of liquid inert solvents as isopentane, hexane, gasoline, benzene, toluene and the like and as the polymerization proceeds the elastomer forms and remains in solution until it is to be recovered. Heretofore recovery of the elastomer in a suitable form has been very difficult and, as far as it is known, has not been suitably achieved.

This invention provides an improved apparatus for the recovery of such elastomers from hydrocarbon solutions.

It is an object of this invention to provide a means for efficiently effecting the separation of the solute from the elastomer by steam.

It is another object of this invention to devise an improved nozzle device which will cause the coagulation of the solid polymer from solution in the form of a readily dryable crumb.

It is a further object of the invention to provide a nozzle device in which the collection of polymer in the nozzle passages is avoided.

The above and other objects of the invention will be understood by those skilled in the art from the following description of a specific embodiment of the invention throughout which reference is made to the accompanying drawing.

In brief, in its simplest form, the invention comprises: a nozzle or mixing and coagulating device for passing a polymer solution through a restriction or through a die into intimate contact with steam jets passing at a substantial angle to the polymer flow and providing a water passageway surrounding the nozzle mixer and means to carry off the coagulated material.

Figure 1:
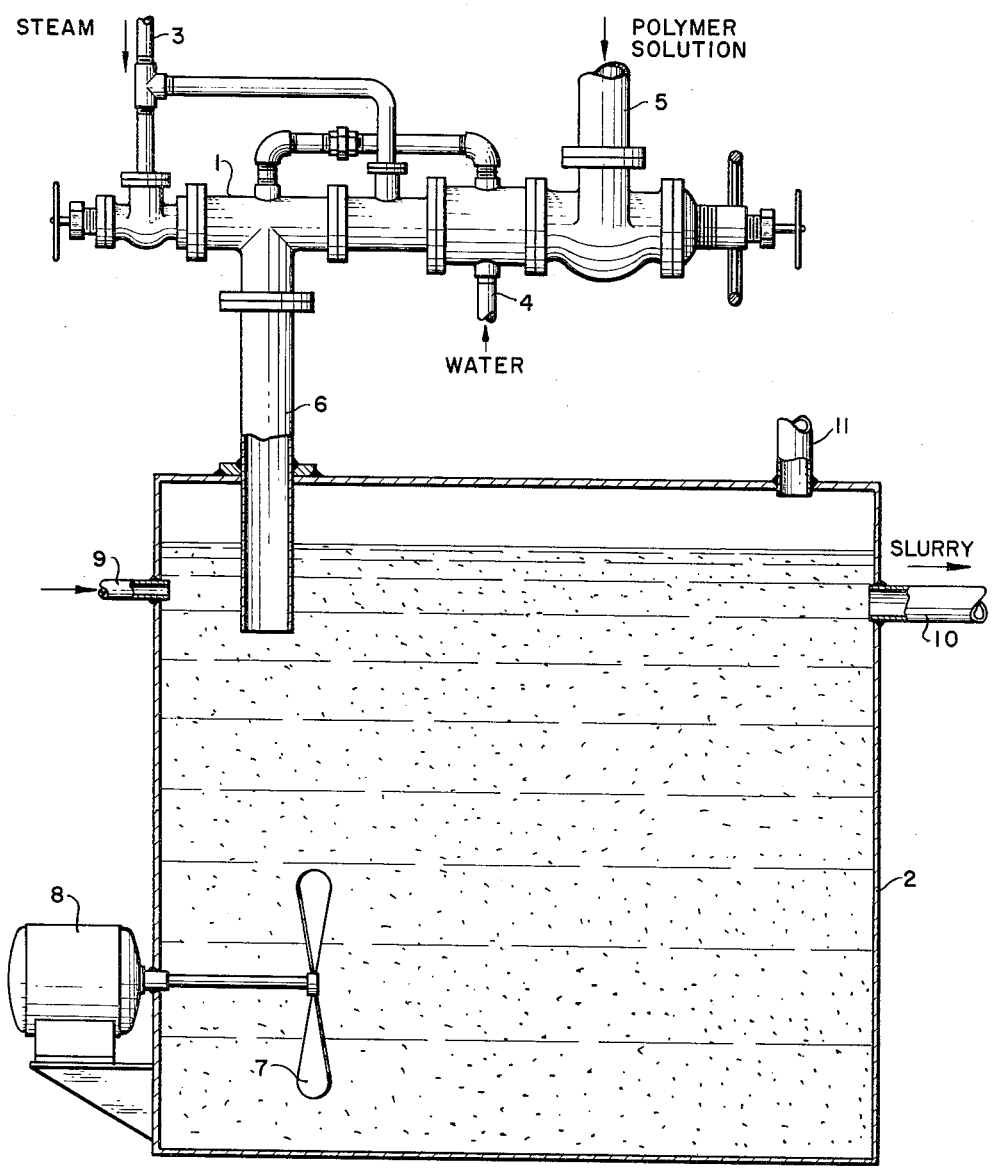
FIG. 1 is an elevation of apparatus partially in section showing the location of the nozzle device in a plant wherein rubber crumb is separated from solution.
Figure 3:
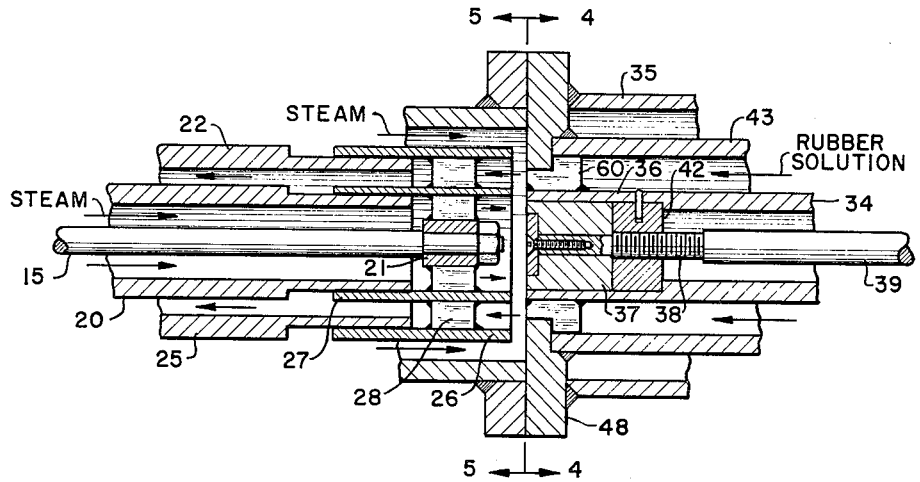
FIG. 3 is a detailed view in elevation of the stream mixing area of the device of FIG. 2.
Figure 4:
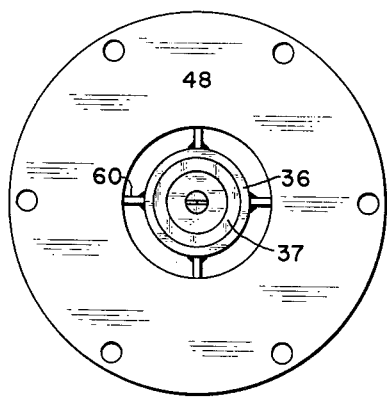
FIG. 4 is a cross-sectional view taken along the line 4—4 of FIG. 3.
Figure 5:
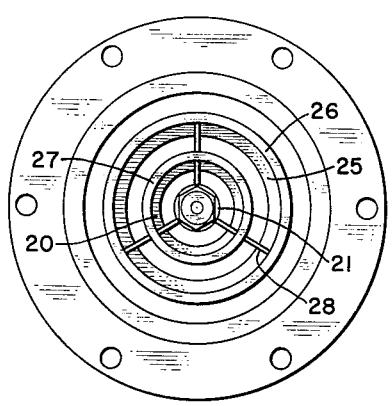
FIG. 5 is a cross-sectional view taken along the line 5—5 of FIG. 3.
Figure 2:
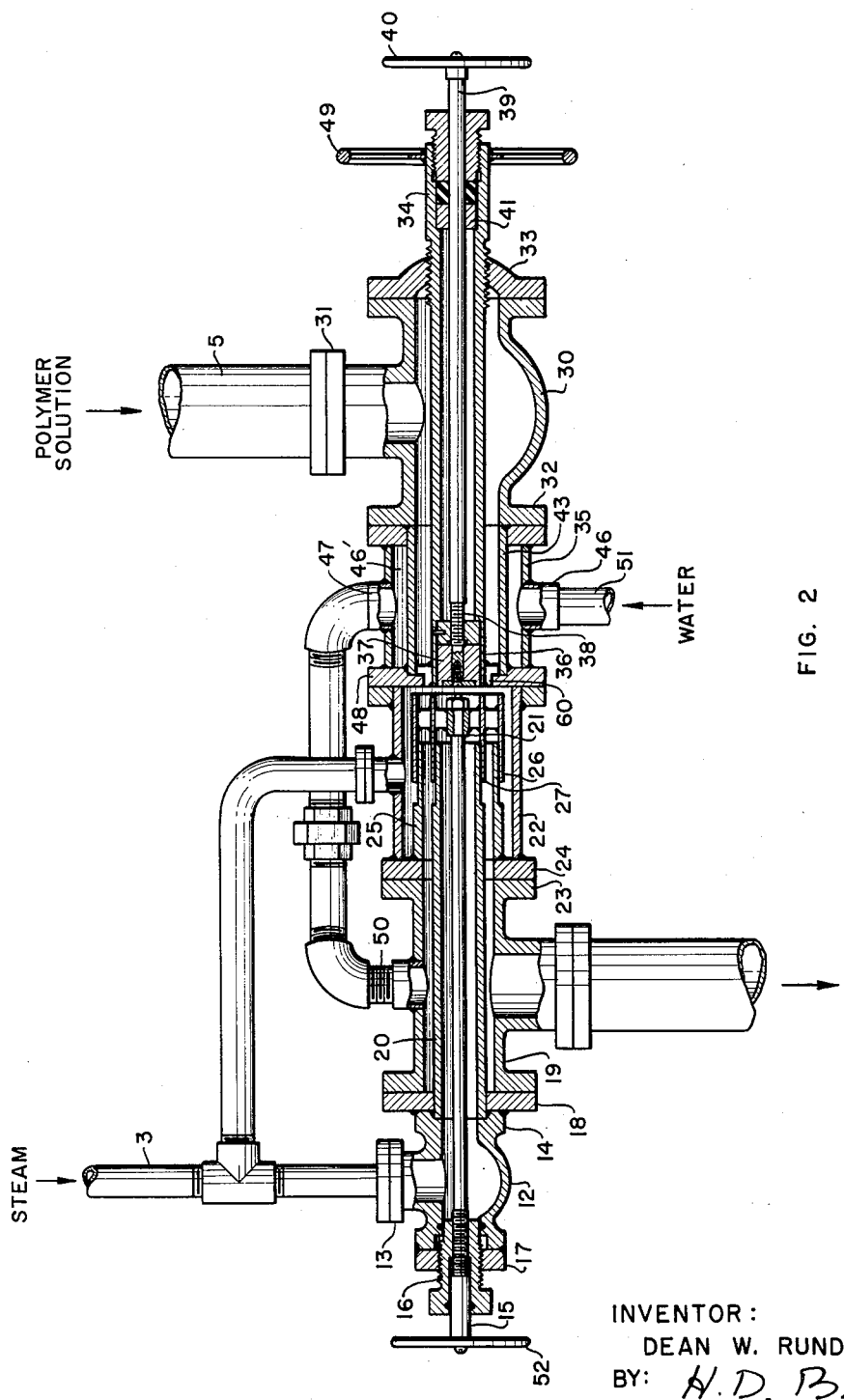
FIG. 2 is an elevation partially in section showing the mixing and coagulating or nozzle device.

FIG. 1 shows a general arrangement of the mixing and coagulating device 1 mounted above a vessel 2 to receive coagulated elastomer hot water. As will be seen, steam from a conduit 3, water from a conduit 4 and elastomer cement or solution from a conduit 5 are, under controlled conditions, passed into the device 1. Elastomer crumb and hot water flows into the vessel 2 through a downpipe 6.

The vessel 2 is preferably provided with an agitator 7 operated by a motor 8 to help keep the crumb in suspension in the hot water in the vessel. If necessary, additional water may be added to the vessel through a conduit 9. The elastomer crumb and hot water flow from the vessel 2 as a slurry through pipe 10 and the slurry is then taken to apparatus for separating the elastomer crumb from its water carrier. This may be effected by separators of centrifugal type or other type as will be apparent to those skilled in the art.

Vapors, such as solvent vapor and water vapor, carried into or released in the vessel 2 and collecting in its vapor space are removed by conduit 11. The solvent may be subsequently recovered for re-use.

While FIG. 1 shows a typical location of the nozzle device 1 in apparatus for the recovery of elastomer, it will be realized that the device 1 can be also be located below the vessel 2 or at the side of the vessel 2.

Referring to FIGS. 2, 3, 4 and 5 which together show the construction of the nozzle device 1, as well as the flow of materials through it, the device proper comprises several sections, namely, a steam jetting section, a cement or solution extruding section, a solvent flashing section and a quenching section.

The steam-jetting section comprises a casing 12 provided with a flanged inlet piece 13 mounted at right angles to a flanged outlet piece 14 attached to the steam feed piping 3. A threaded shaft 15 cooperating with an internally threaded bushing 16 is fitted in a flanged bonnet 17 of the casing 12. The outlet flange 14 is secured to the end plate 18 of a flanged tubular cross-piece 19. Surrounding the shaft 15 and axially arranged in the cross-piece 19 and secured at one end to the end plate 18 is a steam conduction tube 20. The shaft 15 terminates in a steam distribution cap 21 provided with a ring 27. The shaft 15 is journaled in the center of the cap 21 at its inner end and at the bonnet end is threadedly mounted. The ring 27 is telescopically mounted on the tube 20. A short pipe nipple 22 is attached to the flanged end 23 of the cross-piece 19 by means of its flanged end 24 which is provided with an internal tubular piece 25 axially mounted therein and concentric to the steam tube 20 mentioned above. An outer ring 26 of the cap 21 is telescopically mounted on such tubular piece 25. Webs 28 connect rings 26 and 27 of the cap together as will be seen from FIGS. 3 and 5. The solution or cement extrusion section comprises a casing 30 similar to that of a globe T having a flanged side inlet 31 and a flanged outlet 32. A bonnet 33 to the casing 30 has a sleeve 34 axially mounted therein which extends throughout the casing 30 into a flanged nipple 35. The sleeve 34 terminates in a cylinder cup 36 having a slidable piston 37. The position of the piston 37 in the cylinder cup 36 is controlled by a screw thread 38 on an axial shaft 39 running through the length of the sleeve 34. The shaft is rotatably mounted at its inner end in the piston 37 and terminates at its other end in a control wheel 40. A suitable bearing 41 is provided in the sleeve 34 to support the shaft 39. The threaded section 38 of the shaft 39 cooperates with a threaded bronze bushing 42 mounted in the sleeve 34 as will be clearly seen from FIG. 3. The flanged nipple 35 is provided with an inner concentric tube 43 which forms a passageway to the inside of the casing 30. Suitable pipe connections 46 and 47 enable the annular chamber formed to be used as a heating or cooling jacket. The cylinder cup 36 fits with a small annular clearance into an opening in the end plate 48. The assembled cylinder cup and tube 34 may be moved axially by means of a control wheel 49 mounted on the tube 34 external to the bonnet 33. The tube 34 may be axially and slideably moved in the bonnet 33 or have its axial movement controlled by screw threads on the tube 34 and on the interior of the bonnet 33.

The cylinder cup 36 in addition to acting as a primary element of an adjustable polymer solution extrusion die opening can be equipped with strategically located scrapers or knives 60 for cleaning polymer coagulation from the walls of the polymer feed conduit 43 and the outer wall of the die opening. The scrapers or knives 60 will scrape the walls of the conduit 43 in the vicinity of the extrusion die opening as the cylinder cup is withdrawn or inserted into the die opening by turning the externally located control wheel 49. Loose coagulum from the scraper action is flushed through the extrusion die opening when the cylinder cup 36 and piston 37 are withdrawn from the die opening. Retraction of piston 37 into cup 36 also cleans the surface of the piston 37 or the inner wall of the die slot. Close clearances between the exterior surfaces of the knives which are rigidly attached to the cylinder 36 or tube 34 and the inner wall of tube 43 maintains concentricity of the center section of the extrusion die (piston 37 and cup 36) with respect to the outer die wall (end plate 48).

The operation of the nozzle or mixer is as follows: rubber cement or rubber solution, a viscous material consisting of an elastomer and a suitable hydrocarbon solvent such as hexane, benzene, or isopentane, is led by way of conduit 5 into the casing 30. From this area the rubber solution under pressure is forced between the cylinder cup 36 and the opening in the plate 48. As a result, the rubber solution is extruded as a tube into the annular passageway formed between the concentric rings 26 and 27 of the cap 21. Steam under pressure is passed from conduit 3 into the casing 12 and into the pipe nipple 22. As will be more clearly seen by reference to FIG. 3, the steam flowing inside the steam-conduction tube 20 and in the annular space between the cylindrical wall of the pipe nipple 22 and the tubular piece 25 meets the extruded tube of rubber solution at right angles. As a result, the solvent is flashed-off and the rubber is coagulated into crumbs of desired zone.

The crumb and solvent mostly in a vapor state are carried along the elongated annular chamber or inter-tubular space between the concentric tubes 20 and 25, travelling from right to left in the drawing. The above is shown by the indicating arrows in FIG. 3. Upon reaching the cross-piece 19, the mixed crumb and solvent are quenched by water which fills the interior of the cross-piece and is supplied through pipe 50. The water, in the preferred arrangement shown, is continuously fed from a water feed pipe 51 by way of the pipe connections 46 and 47 and the annular chamber 46' surrounding the rubber solution feed section where it first serves to cool the elastomer solution. The rubber crumb, water and solvent then pass as a mixture by way of the downpipe 6 into the vessel 2 as previously mentioned. Here the vaporized solvent can readily separate from the mixture and be withdrawn through outlet 11 for fractionation from any entrained water and subsequent re-use in the process. Additional water may be continuously or intermittently fed to the vessel 2 by the conduit 9. The vessel 2 is preferably provided with a propeller-type agitating means to keep the crumb in suspension and to aid in the separation of solvent. As will be apparent, other agitator means such as eductors, paddle devices or high pressure pneumatic, steam or water jets, et cetera, could be substituted for the propeller-type agitator shown in FIG. 1.

The crumb and water are preferably continuously removed from vessel 2 for separation of the water from the crumb. As will be seen, the apparatus described provides a means for coagulating rubber by removing the solvent by hot streams of steam in such a manner that the steam, while causing rapid evaporation of the solvent, forms the rubber into discrete particles and, particularly, avoids the formation of globules of rubber having water or water-vapor occluded therein. Any such globules or balls are most difficult to handle in subsequent drying or separating operations. The application of the steam both inside and outside the extruded tube of polymer solution with a substantial release of mechanical energy effects, with the difference in temperature between the tube of rubber solvent and the steam, a rapid, complete and efficient coagulation and results in the breaking up of the rubber into crumbs of desired size. The device of the invention, it will be noted, is provided with means to regulate the contacting conditions for the particular rubber or elastomer solution being processed into crumb. To this end it will be noted that the size of the gap between the cylinder cup 36 and the end plate 48 can be adjusted to a desired dimension by rotation of the control wheel 49. In similar manner, by adjustment of handwheel 52 at the end of shaft 15 the telescopic head or cap 21 can be moved backward or forward to regulate both the volume of steam hitting the rubber solution being extruded through the above-mentioned gap and also the velocity of the steam jets.

It will be further noted that a differentiation between the two steam jets, i.e. the inner and outer steam jets, can be effected by movement of the piston 37 relative to the cylinder cup 36. The pressures and temperatures to be used in the apparatus will vary within certain ranges depending on the characteristics of the rubber solution from which it is desired to remove the solvent and form crumb-like particles. When a polyisoprene rubber is to be removed from a solution with isopentane, steam pressure in the order of about 40–130 lbs. per sq. inch are suitable when the polyisoprene content of the solution is about 10%. Lower pressures usually result in a longer drying time being required. With different polymers and different solvents, the steam pressures and volumes will, of course, vary. With a larger percentage of solids and a consequently thicker or more viscous solution higher steam pressure will usually be preferred. Water pressure is not very critical and 50 lbs. per sq. inch pressure has been found quite adequate. The volume of water to solution ratio should be about 10:1 when polyisoprene is being coagulated. With other elastomer solutions, such as butadiene or ethylene-propylene copolymers, a lower ratio may often be employed. The temperature of the water used may vary for different throughputs, different elastomer solutions and different elastomer-solution ratios. In general, a temperature of 60–90° C. has proven satisfactory for isoprene dissolved in isopentane.

While it is usually economical to operate the apparatus under the pressures indicated it will, of course, be appreciated that under certain circumstances very high pressures or even a subatmospheric pressure may be used.

I claim as my invention:

1. In an apparatus for the coagulation of polymer the combination comprising:

an elongated cylindrical casing having a central zone intermediate its ends;

a coaxially mounted cylinder extending from one end of said casing toward said central zone and spaced from the inner wall of said casing to provide a first annular space therebetween for the feed of polymer solution;

a longitudinally movable piston slideably mounted in that end of said cylinder which is adjacent the central zone;

two concentric tubes rigidly mounted in said casing and coaxial therewith, said tubes being mounted in spaced relationship to form a second annular space therebetween, each of said tubes having a free end extending into said central zone adjacent to and spaced from said piston;

a perforate cap having concentric tubular sleeves aligned with and telescopically mounted on the free ends of said two concentric tubes and axially movable on said tubes, the outer of said two concentric tubes being spaced from said casing to form a third annular space within said casing;

means for feeding steam simultaneously into said third annular space and into the bore of the inner concentric tube;

means for feeding a stream of polymer into said first annular space, the alignment and circumferences of said concentric tubes and said cylinder being such that steam fed toward the central zone by passage through said third annular space and steam fed into the bore of said inner of said two tubes contacts the annular stream of polymer fed from said first annular space into said zone at right angles to both the interior and exterior portions of said stream of polymer, said second annular space forming a flow passage for discharge of co-mixed steam and polymer from said central zone.

2. An apparatus as defined in claim 1 including a discharge conduit leading away from said second annular space for receiving said co-mixed steam and polymer, a water jacket surrounding at least a portion of said casing and said first annular space in the region of said central zone, means for supplying water under pressure to said water jacket, and conduit means for discharging water from said water jacket to said discharge conduit.

3. An apparatus as defined in claim 1 including inlet port means in communication with said second annular space downstream of said central zone for injecting a quenching fluid to said co-mixed steam and polymer.

References Cited in the file of this patent

UNITED STATES PATENTS

| | | |
|---|---|---|
| 1,446,514 | Norris | Feb. 27, 1923 |
| 1,713,259 | Chandler | May 14, 1929 |
| 1,934,837 | Zulver | Nov. 14, 1933 |
| 2,682,277 | Marshall et al. | June 29, 1954 |
| 2,875,473 | Mitchell et al. | Mar. 3, 1959 |
| 2,925,412 | Johnston | Feb. 16, 1960 |